US008989281B2

(12) United States Patent
Sullivan et al.

(10) Patent No.: US 8,989,281 B2
(45) Date of Patent: *Mar. 24, 2015

(54) VIDEO QUALITY AND AUDIO QUALITY ADJUSTMENT

(71) Applicant: AT&T Intellectual Property I, LP, Atlanta, GA (US)

(72) Inventors: Marc Sullivan, Austin, TX (US); Keith Crowe, Austin, TX (US); James Pratt, Round Rock, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/162,010

(22) Filed: Jan. 23, 2014

(65) Prior Publication Data

US 2014/0137172 A1    May 15, 2014

Related U.S. Application Data

(60) Continuation of application No. 13/769,266, filed on Feb. 15, 2013, now Pat. No. 8,670,487, which is a division of application No. 12/404,765, filed on Mar. 16, 2009, now Pat. No. 8,401,087.

(51) Int. Cl.
| *H04N 7/12* | (2006.01) |
| *H04N 21/643* | (2011.01) |
| *H04N 21/436* | (2011.01) |
| *H04N 21/4402* | (2011.01) |
| *H04N 21/647* | (2011.01) |

(52) U.S. Cl.
CPC ... *H04N 21/64322* (2013.01); *H04N 21/43615* (2013.01); *H04N 21/440227* (2013.01); *H04N 21/64792* (2013.01)

USPC ............ 375/240.26; 725/93; 725/94; 725/95; 725/139

(58) Field of Classification Search
USPC .............................................. 725/139, 93–95
See application file for complete search history.

(56) References Cited

U.S. PATENT DOCUMENTS

| 5,793,416 | A   | * | 8/1998  | Rostoker et al. ........... 348/14.13 |
| 6,044,396 | A   |   | 3/2000  | Adams |
| 7,058,802 | B1  | * | 6/2006  | Epstein et al. ................ 713/150 |
| 7,245,663 | B2  | * | 7/2007  | Van Der Schaar et al. ........................ 375/240.26 |
| 2004/0055020 | A1 |   | 3/2004  | Delpuch |
| 2006/0056455 | A1 | * | 3/2006  | Floriach et al. ............... 370/469 |
| 2008/0155586 | A1 |   | 6/2008  | Yang et al. |
| 2008/0273591 | A1 |   | 11/2008 | Brooks et al. |
| 2010/0098192 | A1 | * | 4/2010  | Ling et al. ..................... 375/332 |

FOREIGN PATENT DOCUMENTS

WO    WO02/087255    10/2002

* cited by examiner

*Primary Examiner* — Olugbenga Idowu
(74) *Attorney, Agent, or Firm* — Guntin & Gust, PLC; Ralph Trementozzi

(57) ABSTRACT

A system that incorporates teachings of the present disclosure may include, for example, a system having a controller to allocate between a video and audio quality in a multimedia presentation and to utilize a resultant bandwidth as a result of allocation to enhance an audio or video quality in the multimedia presentation in response to a user selection among levels of video quality and audio quality. Other embodiments are disclosed.

20 Claims, 4 Drawing Sheets

VIDEO QUALITY AND AUDIO QUALITY ADJUSTMENT

CROSS-REFERENCE TO RELATED APPLICATIONS

This application is a continuation of U.S. patent application Ser. No. 13/769,266, filed Feb. 15, 2013, which is a divisional of U.S. patent application Ser. No. 12/404,765 filed Mar. 16, 2009, both of which are incorporated herein by reference in its entirety.

FIELD OF THE DISCLOSURE

The present disclosure relates generally to audio and video presentations and more specifically to an adjustment of video and audio quality.

BACKGROUND

With the advent of various versions of Digital Subscriber Line (xDSL) technology, service providers are now able to provide broadband services to residences and commercial establishments over twisted pair lines. Broadband services can include Internet service, telephony, and interactive Television (iTV). In the case of iTV services, the service provider typically reserves a portion of broadband services to allocate a selection of standard definition and in some instances high definition channels which can be presented by way of a common set-top box. The service provider can similarly reserve a portion of broadband services for telephony.

DETAILED DESCRIPTION

One embodiment of the present disclosure can entail a method at a set top box (STB) having viewer controlled allocation between video quality and audio quality in a Internet Protocol Television (IPTV) presentation where the audio quality and the video quality are adjusted at the expense of each other while still maintaining a consistent total digital stream bandwidth.

Another embodiment of the present disclosure can entail a computer-readable storage medium at a server having computer instructions for adjusting between a video quality and an audio quality in a Interactive Television (iTV) presentation in response to a user selection where the audio quality and the video quality are adjusted at the expense of each other.

Yet another embodiment of the present disclosure can entail a media processor such as a set top box having a controller to adjust a video quality in an Internet Protocol Television (IPTV) presentation and utilize a resultant bandwidth as a result of reducing the video quality to enhance an audio quality in the IPTV presentation in response to a user selection among levels of video quality and audio quality.

Yet another embodiment of the present disclosure can entail a server having a controller to adjust a video quality and an audio quality in an Internet Protocol Television (IPTV) presentation based on a user selection of video quality and audio quality levels and utilize a resultant bandwidth as a result of adjusting to perform among the functions of increasing the video quality by adding a layer of video to a digital stream while removing a layer of audio from the digital stream or increasing the audio quality by adding a layer of audio to a digital stream while removing a layer of video from the digital stream.

Figure 1:
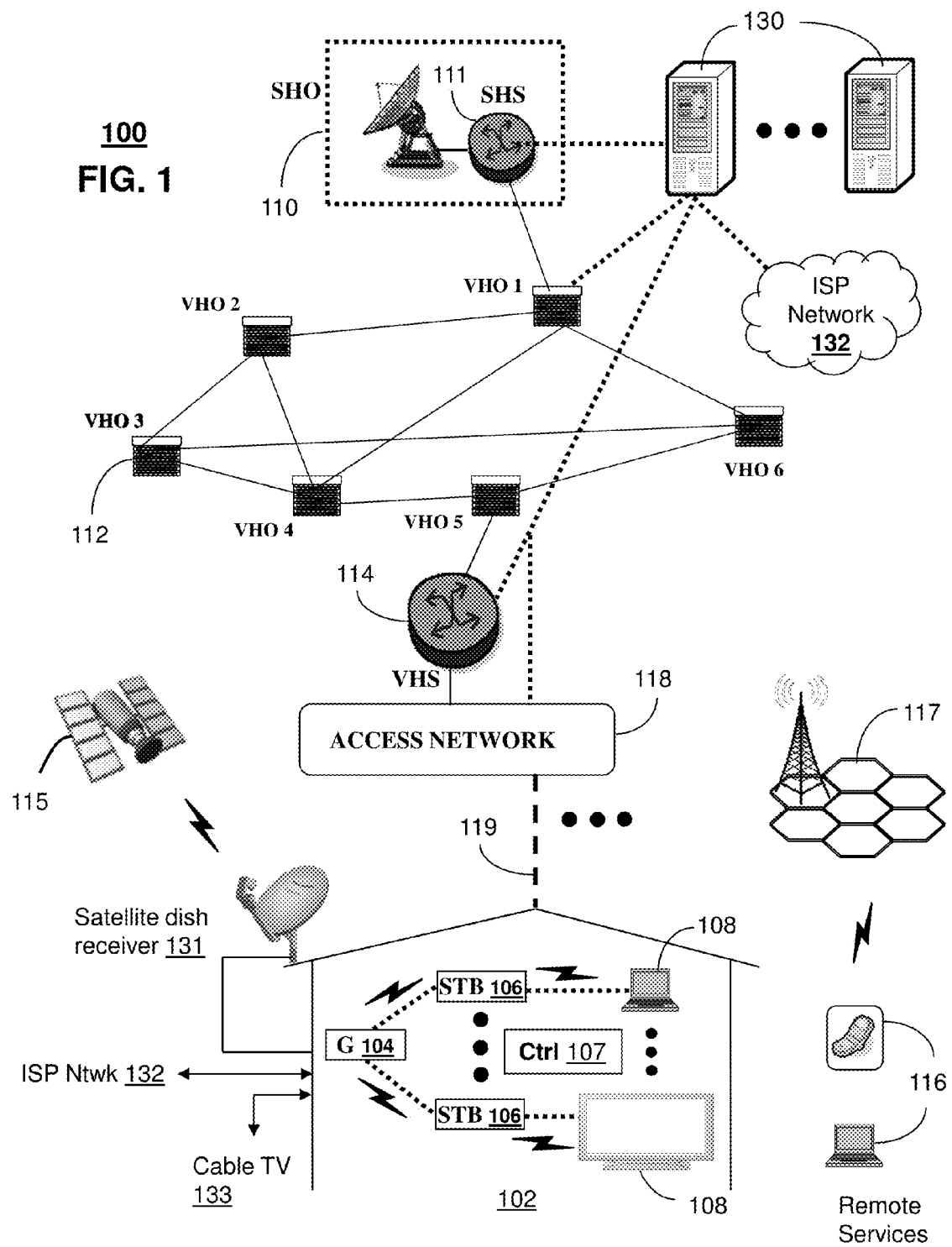
FIG. 1 depicts an illustrative embodiment of a communication system.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

Another distinct portion of the computing devices 130 can function as a server (herein referred to as server 130). The server 130 can use common computing and communication technology to perform the function of adjusting between a video quality and an audio quality in a Interactive Television (iTV) or an IPTV presentation in response to a user selection where the audio quality and the video quality are adjusted at the expense of each other as will be further described with respect to FIG. 4.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
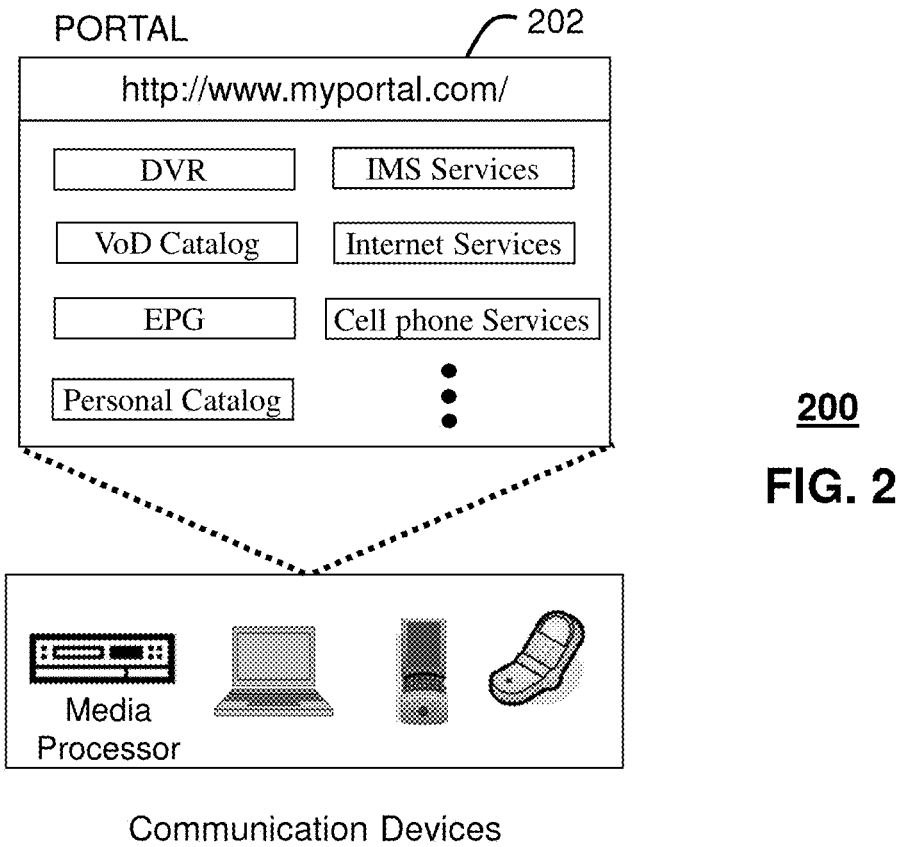
FIG. 2 depicts an illustrative embodiment of a portal interacting with the communication system of FIG. 1.

FIG. 2 depicts an illustrative embodiment of a portal 202 which can operate from the computing devices 130 described earlier of communication 100 illustrated in FIG. 1. The portal 202 can be used for managing services of communication systems 100-200. The portal 202 can be accessed by a Uniform Resource Locator (URL) with a common Internet browser such as Microsoft's Internet Explorer™ using an Internet-capable communication device such as those described for FIGS. 1-2. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on. The portal 202 can also be used to allocate the relative quality settings for video quality and audio quality as further described herein. Note that the video and quality settings can also be set at the media processor or set top box in other embodiments. In yet other embodiments, the quality settings can be set at either the media processor or the portal (or server).

Figure 3:
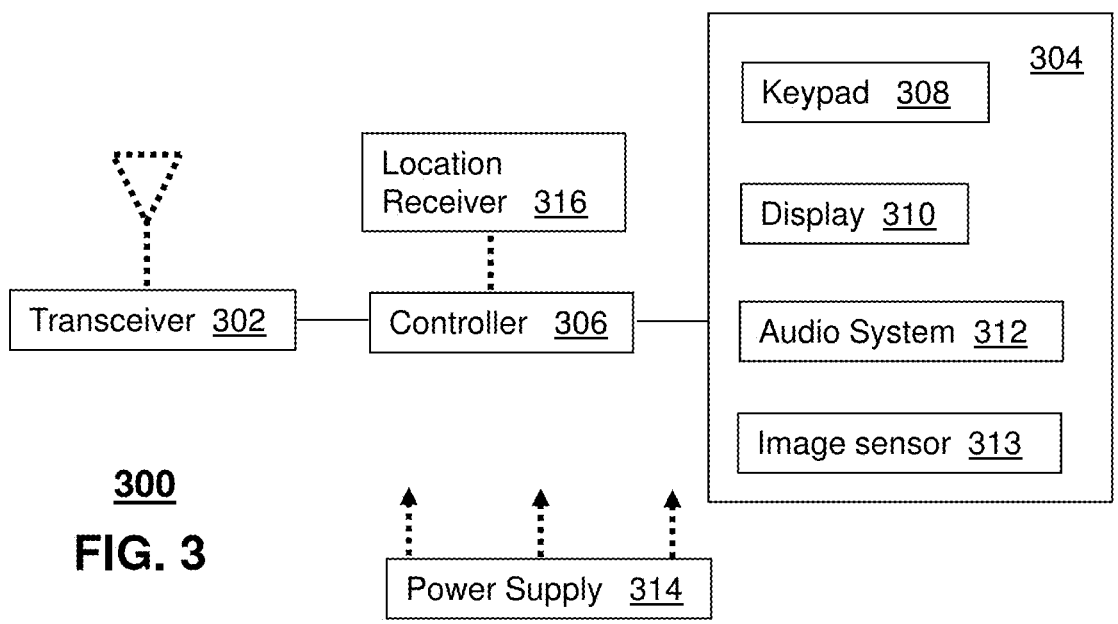
FIG. 3 depicts an illustrative embodiment of a communication device utilized in the communication system of FIG. 1.

FIG. 3 depicts an exemplary embodiment of a communication device 300. Communication 300 can serve in whole or in part as an illustrative embodiment of the communication devices of FIGS. 1-2. The communication device 300 can comprise a wireline and/or wireless transceiver 302 (herein transceiver 302), a user interface (UI) 304, a power supply 314, a location receiver 316, and a controller 306 for managing operations thereof. The transceiver 302 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 304 can include a depressible or touch-sensitive keypad 308 with a navigation mechanism such as a roller ball, joystick, mouse, or navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a Qwerty keypad with alphanumeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The audio system 312 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location receiver 316 can utilize common location technology such as a global positioning system (GPS) receiver for identifying a location of the communication device 100 based on signals generated by a constellation of GPS satellites, thereby facilitating common location services such as navigation.

The communication device 100 can use the transceiver 302 to also determine a proximity to a cellular, WiFi or Bluetooth access point by common power sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such a Flash, ROM, RAM, SRAM, DRAM or other storage technologies.

The communication device 300 can be adapted to perform the functions of the media processor 106, the media devices 108, or the portable communication devices 56 of FIG. 1. It will be appreciated that the communication device 300 can also represent other common devices that can operate in communication systems 100 of FIG. 1 such as a gaming console and a media player.

Figure 4:
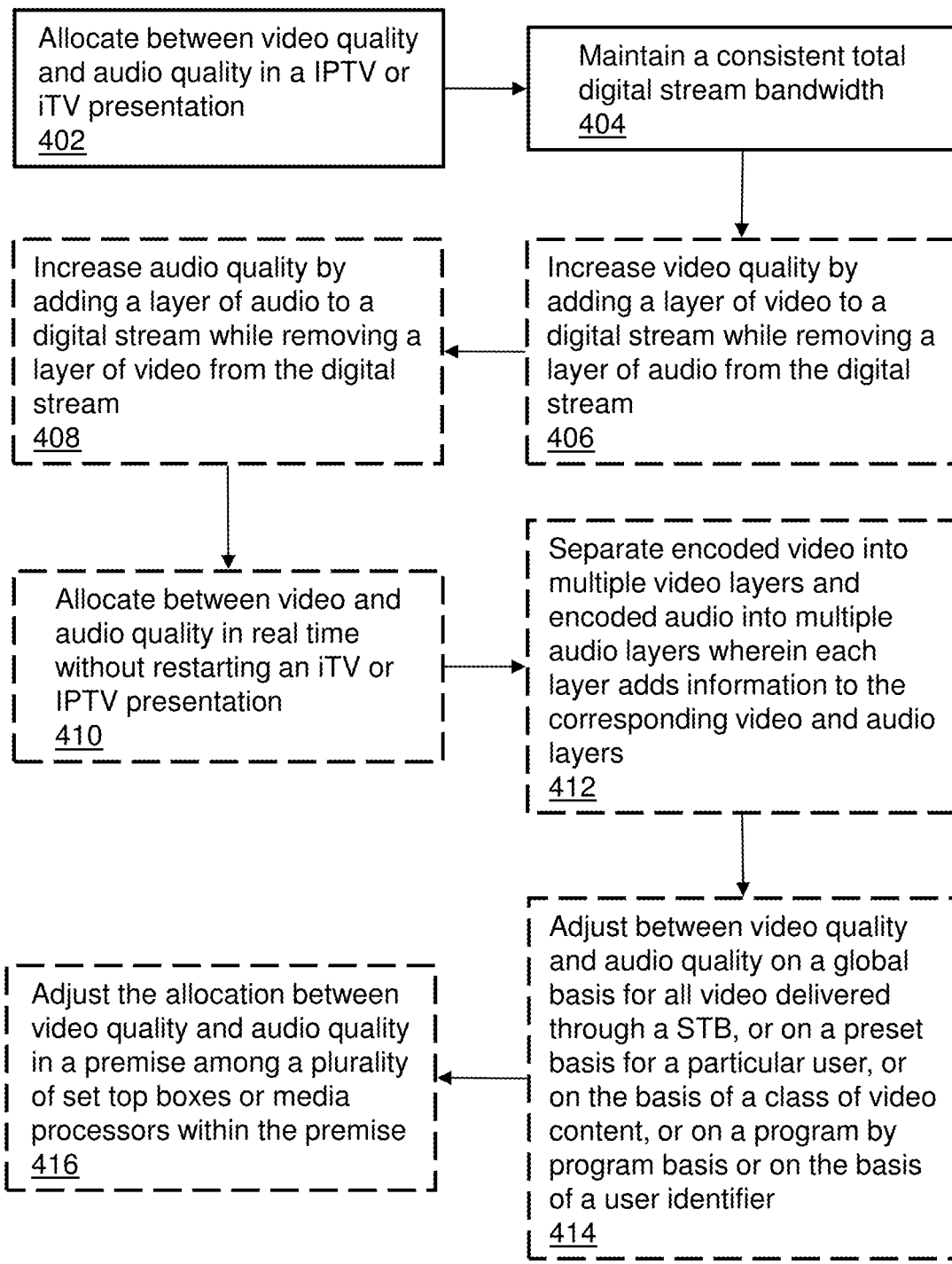
FIG. 4 depicts an illustrative embodiment of a method operating in portions of the communication system of FIG. 1.

FIG. 4 depicts an illustrative method 400 that operates in portions of the communication system of FIG. 1 such as at a media processor or set top box. Method 400 can begin with at 402 in which a viewer controlled allocation between video quality and audio quality in a Internet Protocol Television (IPTV) presentation (or an Interactive TV or iTV presentation) is made. At 404, the audio quality and the video quality are adjusted at the expense of each other while still maintaining a consistent total digital stream bandwidth. The audio and video quality can be "yoked" together so as to maintain the same total stream bandwidth. This yoking enables IPTV or iTV services to operate efficiently and intelligently and facilitates service quality and cost controls for a given system. The overall bandwidth remains the same yet the relative quality of audio versus video quality is adjusted.

The allocation of bandwidth can be achieved in a number of ways that can allow a viewer to use viewer controlled video versus audio quality tradeoffs. For example, at 406, the video quality can be increased by adding a layer of video to a digital stream while removing a layer of audio from the digital stream. At 408, the audio quality can be increased by adding a layer of audio to a digital stream while removing a layer of video from the digital stream. Note, as shown in 410, that the allocation or adjustment can occur in real time without restarting an iTV or IPTV presentation. This can be achieved in one embodiment at 412 by separating encoded video into multiple video layers and encoded audio into multiple audio layers wherein each layer adds information to the corresponding video and audio layers. When a user/viewer/customer chooses to increase the level of video (or audio) quality, the next highest layer is delivered in addition to a base layer. There can be a large number of gradations of quality levels allowing the viewer to control the video (or audio) quality in a gradual fashion.

The allocation or adjustment between video quality and audio quality can be on the basis of a number of factors as shown at 414 and 416. The video quality and the audio quality can be adjusted on a global basis for all video delivered through the STB or through a particular service. The video quality and the audio quality can be adjusted on a basis preset for a particular user or on the basis of a particular class of video content. For example, the adjustment can be done to a class of video that is classified as being a high definition video or that is classified as being in a particular genre. There is no limitation necessarily as to the classification that may be given to a video presentation in this context. Of course, the video quality and the audio quality can be adjusted on a video program by video program basis for a particular program. Furthermore, different viewers can preset a quality allocation profile that can be called up onscreen or though any other viewer identification process such as by logging in or obtaining biometric, psychographic, or behavioral information associated with a particular user.

Upon reviewing the aforementioned embodiments, it would be evident to an artisan with ordinary skill in the art that said embodiments can be modified, reduced, or enhanced without departing from the scope and spirit of the claims described below. For example, in a premise with multiple media processor or set top boxes can use the embodiments herein to allocate bandwidth among several media processors. For example, if enough bandwidth is allocated for 100 high definition (HD) video channels at the expense of lower quality audio channels for a particular premise, several HD video quality channels can be lowered in order to provide enhanced audio quality for a number of media processors or set top boxes within the particular premise. Thus, the allocation of quality can not only be between video and audio quality for a particular presentation, but the allocation can be further allocated among a plurality of devices within a premise.

Other suitable modifications can be applied to the present disclosure without departing from the scope of the claims below. Accordingly, the reader is directed to the claims section for a fuller understanding of the breadth and scope of the present disclosure.

Figure 5:
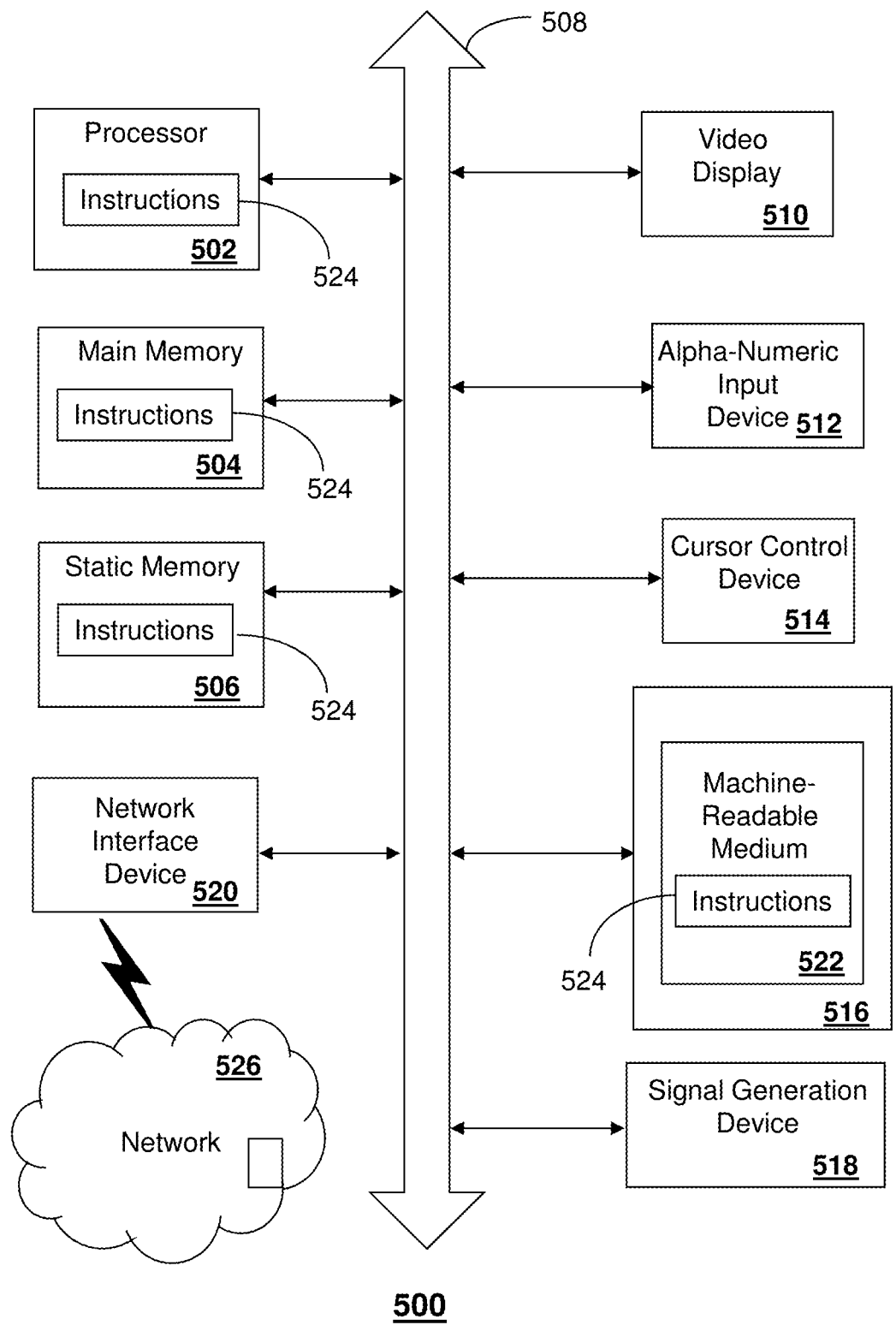
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   receiving, by a system comprising a processor, an indication of a user preference of one of increased video quality having decreased audio quality or increased audio quality having decreased video quality; and
   adjusting, by the system, video quality and audio quality of a plurality of media content channels supplied to the system based on the indication of the user preference to create a new presentation configuration of the plurality of media content channels, while maintaining a consistent total digital stream bandwidth to the system,
   wherein the adjusting of the video quality and the audio quality of the plurality of media content channels comprises increasing a first number of layers of encoded video in a digital stream, while decreasing a second number of layers of encoded audio in the digital stream to increase the video quality and decrease the audio quality of the plurality of media content channels, or increasing the second number of layers of encoded audio in the digital stream while decreasing the first number of layers of encoded video in the digital stream to increase the audio quality and decrease the video quality of the plurality of media content channels.

2. The method of claim 1, wherein the media content channels are provided by a broadcast video service.

3. The method of claim 1, wherein the media content channels are provided by a cable television system.

4. The method of claim 1, wherein the media content channels are provided by a satellite television system.

5. The method of claim 1, wherein the media content channels are provided by an interactive television system.

6. The method of claim 1, wherein the adjusting of the video quality comprises selecting among a plurality of levels of video quality, and wherein the adjusting of the audio quality comprises selecting among a plurality of levels of audio quality.

7. The method of claim 1, wherein the system comprises a media processor.

8. The method of claim 1, wherein the system comprises a portable communication device.

9. The method of claim 1, wherein the system is a network device providing media services to a media processor.

10. A system, comprising:
   a memory that stores executable instructions; and
   a controller in communication with the memory, wherein the controller, responsive to executing the instructions, facilitates performance of operations comprising:
      receiving a selection via a user interface from options comprising one of a selected video quality a selected audio quality or a combination thereof; and
      adjusting between a video quality and an audio quality in a multimedia presentation based on the selection to create a new presentation configuration of the multimedia presentation, wherein the adjusting between the video quality and the audio quality of the multimedia presentation comprises increasing a first number of layers of encoded video in a digital stream, while decreasing a second number of layers of encoded audio in the digital stream to increase the video quality and decrease the audio quality of the multimedia presentation, or increasing the second number of layers of encoded audio in the digital stream, while decreasing the first number of layers of encoded video in the digital stream to increase the audio quality and decrease the video quality of the multimedia presentation.

11. The system of claim 10, wherein the multimedia presentation is provided by a broadcast video service.

12. The system of claim 10, wherein the multimedia presentation is provided by a cable television system.

13. The system of claim 10, wherein the multimedia presentation is provided by a satellite television system.

14. The system of claim 10, wherein the system is a portable communication device.

15. The system of claim 10, wherein the system is a network device providing media services to a media processor.

16. A machine-readable storage device, comprising executable instructions that when executed by a processor, cause the processor to facilitate performance of operations comprising:

receiving a selection via a user interface from options comprising one of a selected video quality, a selected audio quality, or a combination thereof; and adjusting between a video quality and an audio quality in television multimedia presentation based on the selection to create a new presentation configuration of the multimedia presentation, wherein the adjusting between the video quality and the audio quality of the multimedia presentation comprises increasing a first number of layers of video in a digital stream, while decreasing a second number of layers of audio in the digital stream to increase the video quality and decrease the audio quality of the multimedia presentation, or increasing the second number of layers of audio in the digital stream, while decreasing the first number of layers of video in the digital stream to increase the audio quality and decrease the video quality of the multimedia presentation.

17. The machine-readable storage device of claim 16, wherein the first number of layers of video in the digital stream comprise encoded video and wherein the second number of layers of audio in the digital stream comprise encoded audio.

18. The machine-readable storage device of claim 16, wherein the multimedia presentation is provided by one of a broadcast video service, a cable television system, a satellite television system or an interactive television system.

19. The machine-readable storage device of claim 16, wherein the processor is a portable communication device processor.

20. The machine-readable storage device of claim 16, wherein the processor is a network device processor providing media services to a media processor.

* * * * *